March 13, 1945.  J. J. BLACK  2,371,497

REAR HEADER FOR ROAD VEHICLES

Filed July 7, 1943  2 Sheets-Sheet 1

INVENTOR.
BY James J. Black
Wood, Arey, Herron & Evans
Attorneys

March 13, 1945.   J. J. BLACK   2,371,497
REAR HEADER FOR ROAD VEHICLES
Filed July 7, 1943   2 Sheets-Sheet 2

INVENTOR.
James J. Black
BY Wood, Arey, Herron & Evans
Attorneys.

Patented Mar. 13, 1945

2,371,497

UNITED STATES PATENT OFFICE 2,371,497

REAR HEADER FOR ROAD VEHICLES

James J. Black, Cincinnati, Ohio, assignor to The Trailer Company of America, Cincinnati, Ohio, a corporation of Delaware Application July 7, 1943, Serial No. 493,692

5 Claims. (Cl. 296—137)

This invention relates to a rear header for road vehicles such as trailers, trucks and the like and is particularly concerned with the construction of a rear header which is readily removable from the vehicle to facilitate loading and one which can be utilized as a clamp to draw together to vertical position the side walls of the vehicle.

In various types of trucks and trailers, particularly those of the open top construction, the rear header performs an important function in maintaining the general rigidity of the body, and particularly in preventing the side walls of the vehicle from spreading outwardly. Since open top vehicles are generally designed and utilized for loading from above as by a crane, it is frequently desirable to completely remove the rear header as well as the various roof bows to facilitate the loading of the vehicle. After the vehicle has been loaded it frequently happens that the side walls have spread outward slightly so that when the loading has been completed and the rear header is again placed in position it is necessary to correct this outward spread and bring the walls back again to vertical position.

The instrumentalities proposed for this purpose in the past have been cumbersome and difficult to remove and to reposition after loading. They have also, to a large extent, lacked the function provided in the present invention of exerting a strong and continuous inward pressure against the side walls. In addition, the structures of the prior art have been so arranged that when it is desired to remove them for loading purposes they must be completely removed.

One of the objects of the present invention has been to provide a rear header structure which can be readily removed in its entirety or which, optionally, can be simply detached at one end and swung out of the way.

Another object has been the provision of a rear header construction in which the ease of removal and reattachment has been greatly increased.

Another object has been the provision of a rear header which can be securely locked in position between the side rails so as to absolutely prevent outward movement of the sides of the vehicle.

Another object has been the provision of a rear header construction which can be utilized as a clamp to exert positive inward pressure on the side walls to correct a spread which has occurred during loading or otherwise.

Other and further objects and advantages will be apparent from a further and more detailed description of the invention when considered in conjunction with the drawings in which.

Figure 2:
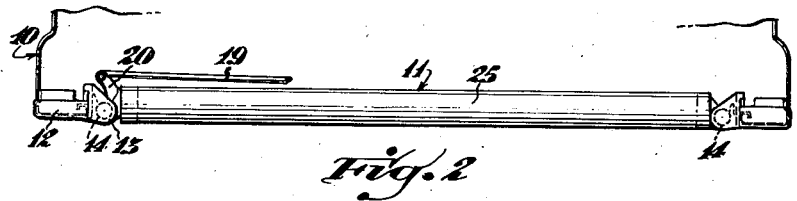
Figure 2 is a top plan view of the rear header in closed and locked position.
Figure 1:
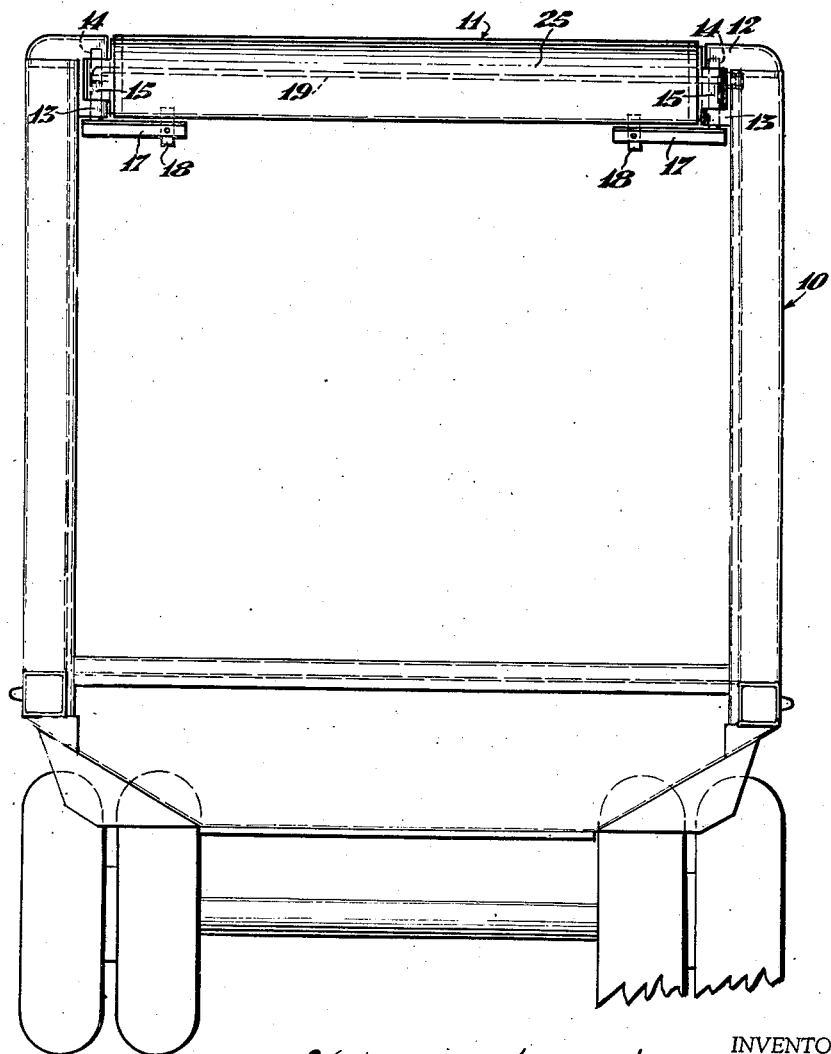
Figure 1 is a rear elevation of a typical road vehicle, such as a trailer, with the rear header of the invention in closed and locked position.

Referring again to the drawings for a further and more detailed description of the invention, in Figure 1 a typical road vehicle of the type with which the invention is adapted to be used, in this instance a trailer, is indicated generally at 10. The rear header shown in position between the upper rear corner posts of the vehicle is indicated generally at 11. Side rail extensions from the corner posts with which the header is adapted to engage have been designated at 12. Bracket members 13 are rigidly secured as by welding to the side rail extensions at both sides of the vehicle. Vertical shafts 14 are journalled in these bracket members.

Figure 4:
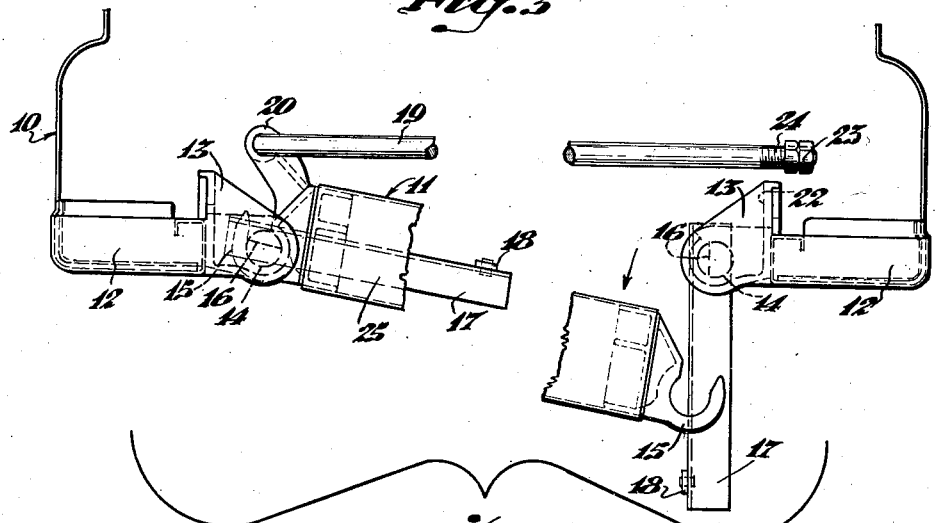
Figure 4 is a view similar to Figure 3 showing the rear header disengaged at one end and in unlocked position.
Figure 5:
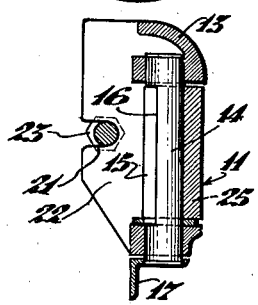
Figure 5 is a sectional view along the line 5—5, Figure 3.

The rear header 11 comprises, generally, a rail portion 25 which may be rounded on its upper rear edge for improved appearance. Hook elements 15 which may be integral with or rigidly secured to the body of the header are positioned at either end thereof and are adapted to engage with the shafts 14 to hold the header securely in position. These shafts 14 may have a flattened surface 16 extending along one edge to permit disengagement of the hooks when the shafts are turned to the position illustrated in Figure 4. Latch rods 17 are rigidly secured to the shafts at one end thereof and are pivotal outwardly so that outward movement of these latch rods away from the vehicle body operates to turn the shafts to a position in which the hooks may be disengaged. Locking lugs 18 are positioned on the free ends of the latch rods and are utilized to engage these ends of the latch rods with the body of the rear header when the header is in locked position in the manner best illustrated in Figure 1.

Figure 3:
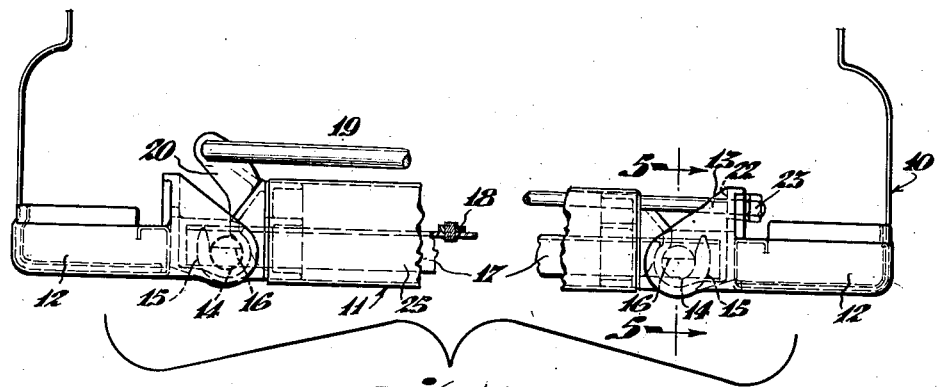
Figure 3 is a view similar to Figure 2 enlarged and with certain portions broken away to better illustrate the details of the construction. In this view the rear header is likewise in closed and locked position.

A lock bar 19 is pivotally secured at one end to an arm 20 extending inwardly from the rear header. It will be noticed that in closed position (Figure 3) the point of attachment of the lock bar to the arm is offset laterally from the shaft. This is an important feature of the preferred form of the construction. At the other end the lock bar is adapted to ride in the slot 21 in an inward extension 22 of the corner bracket 13. Lock nuts 23 are positioned on a screw-threaded portion 24 of the lock bar to hold the bar firmly in position in the slot 21 when the lock bar has been moved to fully closed position.

In the attachment of the device to the vehicle, the shafts 14 are first turned to open position by outward manipulation of the latch rods 17. The hook 15 at the left of the drawings (Figures 3 and 4) is then engaged with the corresponding shaft, and the latch rod on this side is closed. At this point the rail portion 25 of the header should be pivotally inclined outwardly and the lock nuts 23 will be to the right of the bracket extension 22 because of the offset position of the point of attachment of the lock bar 19 and the arm 20 with respect to the left shaft. The lock bar 19 is then engaged in the slot 21 where it is adapted to ride. The rail portion 25 of the header is then swung toward closed position. As the lock bar 19 rides toward the left in the slot 21 the lock nuts 23 engage with the bracket extension 22 and as soon as this engagement occurs the further closing of the rail portion 25 operates to draw together the sides of the vehicle body. As the right side of the rail portion approaches closed position the right shaft and header hook should be exactly aligned and can be closed without difficulty. The closing of the right latch rod and the engagement of the locking lugs 18 with the rail portion 25 of the header complete the locking. The lock nuts 23 are adjustable on the screw-threaded portion 24 of the lock bar and prior to the closing operation should be adjusted thereon to the initially correct position. After this position has once been determined, however, there should be no occasion for changing it.

In disengagement, the lugs, latch rods and lock bar are disengaged in this order and the header can then be manually removed. If it is desired simply to pivot the header out of position rather than to completely remove it, the right hook only may be disengaged with the left remaining in closed position. The header can then be swung outwardly and the lock bar inwardly thereby completely clearing the rear end of the vehicle for loading.

It will be observed that the closing of the rail portion 25 of the header in effect exerts a direct pull of one side wall of the vehicle toward the other and, since the operation takes place at the upper extremity of the side walls, considerable leverage is exerted which is very effective in correcting outward spreading of the walls.

As will be apparent, the device is simple in construction, yet very strong and effective in operation. The attachment and removal of the header can be accomplished readily by a single person in a very short space of time. Obviously, there are various modifications and adaptations of the structure which, while varying in details, do not depart from the principles of the invention as herein described.

Having described my invention, I claim:

1. A header for road vehicles, comprising a rail member disposed between the supporting posts of the vehicle, latch means at each end of said rail member for engaging with the sides of the vehicle, means for connecting and disconnecting said latch means selectively, and a lock bar for drawing the side walls toward one another to facilitate connection of the latch means, said lock bar having an end thereof pivotally connected to an end of the rail member.

2. A header for road vehicles comprising a member adapted to span the side rails, latch means for securing said member to the side walls of the vehicle, one of said latch means providing a pivotal connection, means for drawing the side walls of the vehicle toward one another to facilitate connection of the latch means, said drawing means being secured to the spanning member and pivotally movable therewith whereby both the spanning member and the drawing means may be disconnected at one end and swung out of the way without removing the header from the vehicle.

3. A rear header for road vehicles comprising a rail member adapted to span the side walls of the vehicle, attachment means at each end of the rail member for securing said member between the side walls, one of said attachment means providing a pivotal connection, a lock bar likewise disposed between the side walls and connected at one end to the rail member and interconnected at the other end to the side walls of the vehicle, the point of attachment of the lock bar being offset laterally with respect to the point of attachment of the rail member to the side walls whereby inward pivotal movement of the rail member operates to draw together the side walls of the vehicle when the lock bar is in attached position.

4. An upper end rail member for road vehicles comprising a member for spanning the side walls of the vehicle, attachment means providing a pivotal connection between one end of said spanning member and the corresponding side wall, means for drawing the side walls of the vehicle together to facilitate complete engagement of the spanning member with said side walls, said drawing means including a lock bar having one end connected to an end of the rail member, the other end adapted to be connected to the side wall of the vehicle, said lock bar being operable from the inner pivotal movement of the spanning member.

5. A header member for road vehicles comprising a rail member for spanning the side walls of the vehicle, attachment means for securing said rail member to the side walls, one of said attachment means providing a pivotal connection, means operable by the rail member for drawing together the side walls of the vehicle to facilitate complete engagement of the spanning member with the side walls, said means including a lock bar pivotally connected at one end to an end of the rail member.

JAMES J. BLACK.